United States Patent [19]
Takahashi et al.

[11] Patent Number: 4,594,548
[45] Date of Patent: Jun. 10, 1986

[54] MULTI PHASE MAGNETIC SENSOR APPARATUS FOR DETECTING THE POSITION OF MOVING MEMBER

[75] Inventors: Tadashi Takahashi; Kunio Miyashita; Syooichi Kawamata; Shigeki Morinaga, all of Hitachi, Japan

[73] Assignee: Hitachi, Ltd., Tokyo, Japan

[21] Appl. No.: 547,259

[22] Filed: Oct. 31, 1983

[30] Foreign Application Priority Data

Oct. 29, 1982 [JP] Japan .................. 57-189265

[51] Int. Cl.$^4$ .................. G01B 7/14; G01R 33/02
[52] U.S. Cl. .................. 324/208; 338/32 R
[58] Field of Search .............. 324/207, 208, 251, 173, 324/174; 338/32 R

[56] References Cited

U.S. PATENT DOCUMENTS 4,024,458  5/1977  Templin .................. 324/208

Primary Examiner—Ernest F. Karlsen
Assistant Examiner—Walter E. Snow
Attorney, Agent, or Firm—Antonelli, Terry & Wands

[57] ABSTRACT

An apparatus for detecting the position of a moving member comprising a moving member having a magnetic substance with magnetical signals recorded thereon, and a stationary magnetic sensor confronting the moving member and having a plurality of magnetoresistive elements, wherein the magnetoresistive elements are disposed in the magnetic sensor such that the elements have a phase difference of $\pi/m$ in electrical angle, where m is an even number larger than or equal to four, for obtaining the positional signal of the moving member.

7 Claims, 40 Drawing Figures

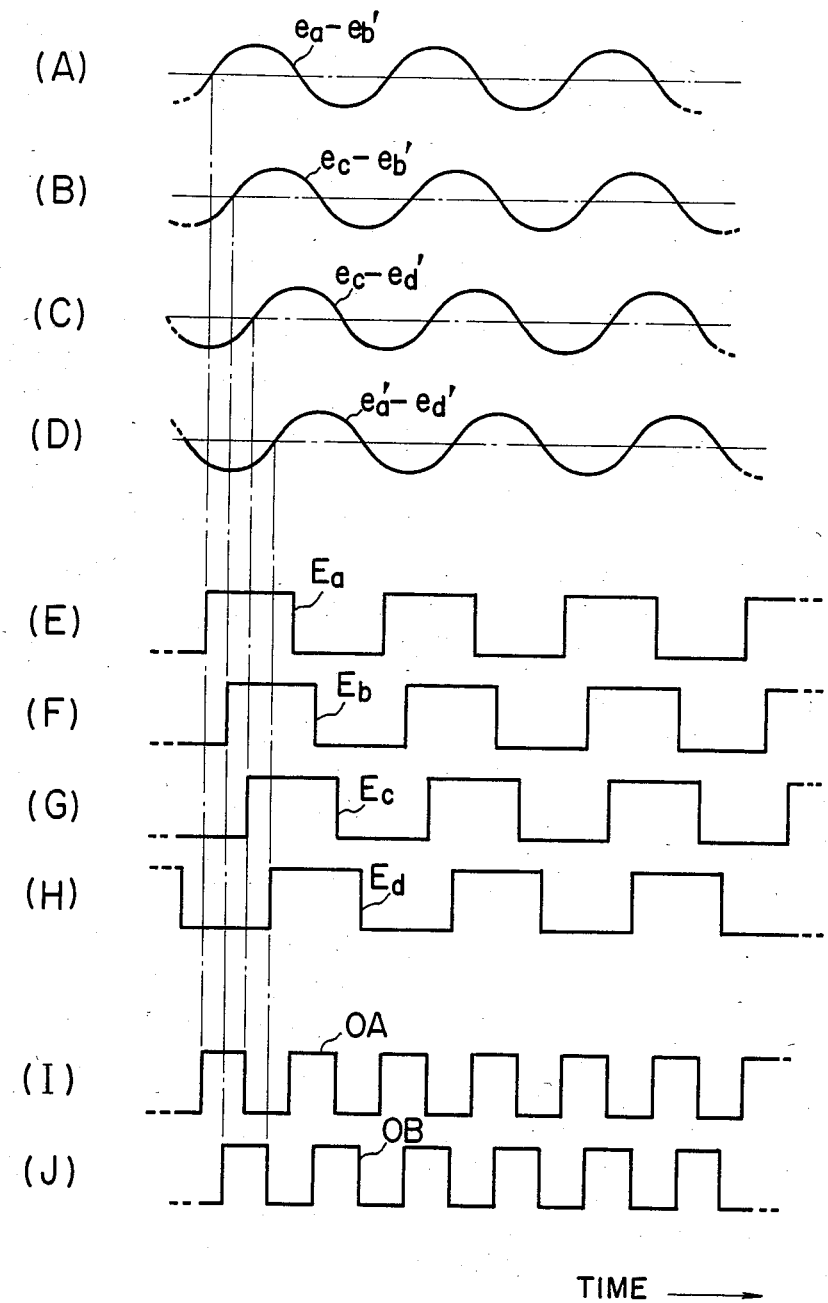

MULTI PHASE MAGNETIC SENSOR APPARATUS FOR DETECTING THE POSITION OF MOVING MEMBER

The present invention relates to an apparatus for detecting the position of a moving member, and particularly, to a position detecting apparatus using magnetoresistive elements.

It is known that when a magnetoresistive element made of a magnetoresistive material such as permalloy is placed in the magnetic field with a current conducted therethrough, the resistance R of the element varies depending on the intensity of the magnetic field H, as shown in FIG. 6. By using a magnetoresistive element in place of the usual magnetic head, it is possible to detect information recorded magnetically on a magnetic recording medium at its zero speed with respect to the magneto-resistive element, i.e., in a stationary state of the medium. It is also known that this principle of the magnetoresistive element is applicable to the detection of the moving speed, moving direction and position of a moving member which rotates or travels along a straight line. For example, U.S. Pat. No. 4,319,188 discloses a rotation detecting system with a plurality of magneto-resistive elements for detecting the angular position, rotational speed and rotational direction of a rotating member which carries information in a magnetic form.

The inventors of the present invention have developed, in advance of this invention, a position detecting system, which will first be described with reference to FIGS. 1 through 5. A motor 1 has a drive shaft 2 with a magnetic drum 5 coupled thereto, and signals are recorded magnetically on the circumferential surface of the drum 5. Confronting the drum surface, a magnetic sensor 4 consisting of magnetoresistive elements is fixed to the motor 1 by a magnetic sensor fixture 3. FIG. 2 shows by expansion the positional relationship between the magnetic drum 5 and the magnetic sensor 4. For the wavelength $\lambda$ (electrical angle of $2\pi$) of the recording signal, magnetoresistive elements $R_{11}$–$R_{14}$ and $R_{21}$–$R_{24}$ are arranged at an interval of $\lambda/4$ in the magnetic sensor 4 as shown in FIG. 2. These magnetoresistive elements are connected as shown in FIG. 3 to form two sets of bridge circuits. The output $e_1$ across terminals $a_1$ and $b_1$ of one bridge circuit and the output $e_2$ across terminals $a_2$ and $b_2$ of another bridge circuit are conducted to amplifiers $OP_a$ and $OP_b$, as shown in FIG. 4, which provide the output OA and OB, respectively. FIG. 5 shows the waveforms of the bridge outputs $e_1$ and $e_2$ by (A) and (B), and the amplifier outputs OA and OB by (C) ana (D), respectively. When the magnetic drum 5 shown in FIG. 1 rotates, the magnetic field strength to the magnetoresistive elements $R_{11}$–$R_{14}$ and $R_{21}$–$R_{24}$ varies, causing the resistance of each element to vary with a phase difference of $\lambda/4$ (electrical angle of $\pi/2$) from each other. The output voltages $e_1$ and $e_2$ of the bridge circuits vary as shown in FIG. 5 (A) and (B), and the signals are amplified and shaped to rectangular waves as shown by (C) and (D) in FIG. 5. Then, the outputs with a phase difference of $\lambda/4$ from each other are obtained. When the motor 1 rotates in the opposite direction, the phase relationship of the outputs OA and OB shown in FIG. 5 (C) and (D) is reversed, that makes it possible the discrimination of rotational direction.

In the foregoing conventional magnetic encoder, it is desired to increase the number of pulses per revolution so that the accuracy of the control system which employs the encoder is improved. In this case, however, if the wavelength $\lambda$ of the recording signal, i.e., the recording pitch shown in FIG. 2, is made shorter, the magnetic field strength to the magnetic sensor 4 decreases and thus the outputs $e_1$ and $e_2$ fall unless the clearance CL between the magnetic sensor 1 and the magnetic drum 5 shown in FIG. 1 is made smaller. A narrower clearance CL will pose problems of assembling accuracy and eccentricity of the motor 1. The magnetic drum 5 may have a larger diameter, but it invites disadvantageously the larger inertia and bulkiness.

Alternatively, the magnetic rotation sensor may be arranged to provide three or more final outputs, but, at a cost of increased number of magnetoresistive elements and a complex control system and wiring for converting multi-phase signals into dual-output signals, since it is a common practice in servo motor concrol systems to use dual-output signals from rotation sensors.

U.S. Pat. No. 4,039,936 discloses a rotation detecting system with a plurality of magnetoresistive elements and permanent magnets for detecting the angular position of a rotating member having a plurality of teeth, wherein three outputs in separate phases produced by the magnetoresistive elements are processed so that the output with a frequency three times that of each output is obtained. The output frequency of this prior art system may be increased by increasing the number of teeth of the rotating member, but, at a risk of machining accuracy.

It is an object of the present invention to provide an apparatus for detecting the position of a moving member in rotation or linear motion which provides the improved accuracy of detection at the minimum number of magnetoresistive elements by increasing the number of pulses per revolution or unit traveling length, without reducing the wavelength $\lambda$ ($2\pi$) of the magnetic recording signal nor increasing the diameter of the magnetic drum or disk.

These and other objects, features and advantages of the present invention will be apparent from the following detailed description of the preferred embodiments thereof taken in conjunction with the accompanying drawings, in which:

FIG. 18 is a set of waveform diagrams showing th phase relationship between the voltage signals at various portions of the circuit shown in FIG. 17;

Figure 7:
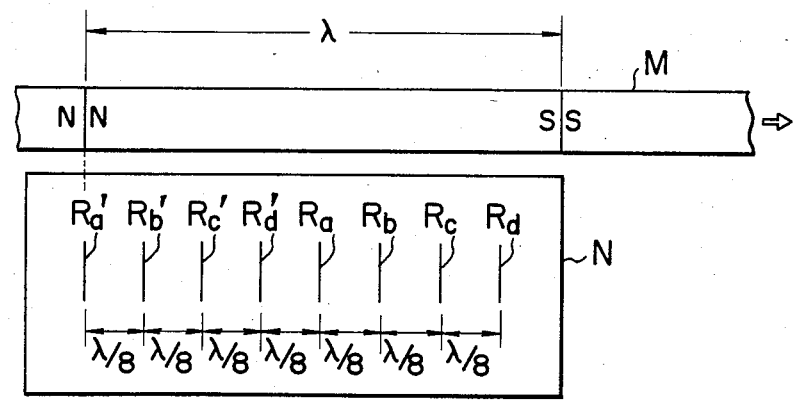
FIG. 7 is an illustration showing by expansion the positional relationship between the magnetoresistive elements and the wavelength $\lambda$ of the magnetic recording signal on the moving member constituting the position detecting apparatus according to the present invention.

Before entering into the embodiments of the present invention, the fundamental idea of the invention will first be described in connection with FIGS. 7 through 12. In FIG. 7, the arrangement includes a magnetic moving member M such as a magnetic drum, magnetic disk or a linear-motion member, and a magnetic sensor N incorporating magnetoresistive elements (MR elements) $R_a$–$R_d$ and $R_a'$–$R_d'$. Throughout FIGS. 7 to 12, the MR elements are disposed with a spacing of λ/8 (electrical angle of $\pi/4$) for the wavelength λ of the recording signal so that quad voltage outputs (4-phase outputs) are obtained (defined to be m=4). The basic arrangement of the magnetic sensor is the use of m+1 sets, i.e., 5 sets, of MR elements ($R_a$, $R_a'$; $R_b$, $R_b'$; $R_c$, $R_c'$; $R_d$, $R_d'$; $R_a$, $R_a'$) disposed such that the resistance variation of each MR element has a phase shift of $\pm\pi/m$ in electrical angle from each other.

Figure 8:
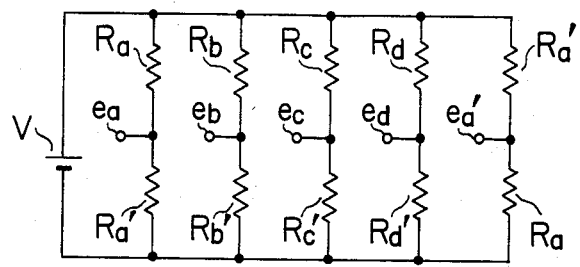
FIGS. 8, 9, 10 and 11 are schematic diagrams showing the connection of the magnetoresistive elements shown in FIG. 7.
Figure 12:
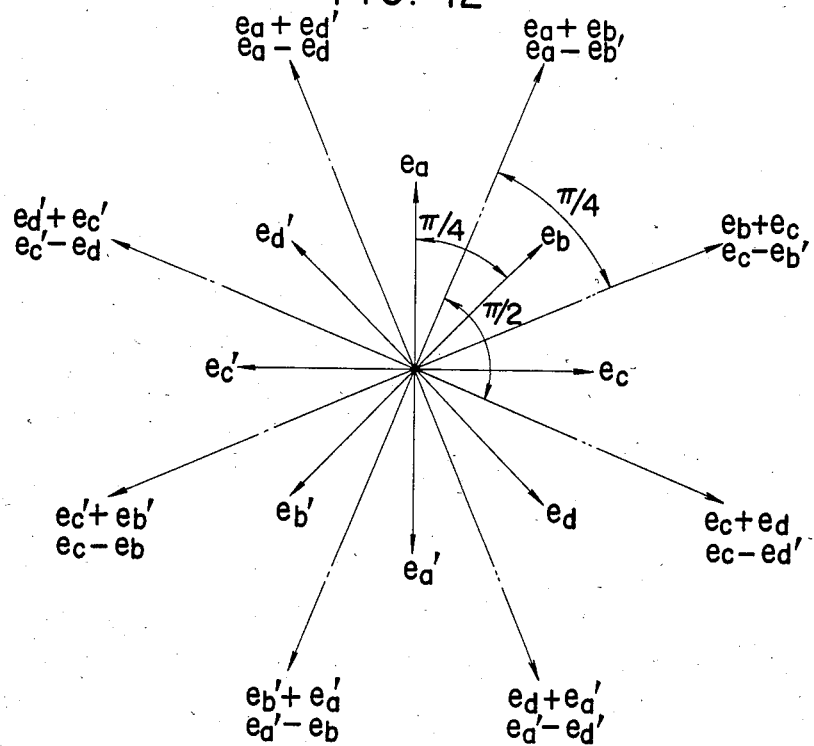
FIG. 12 is a vectorial diagram explaining the phase relationship of the circuits shown in FIGS. 8, 9, 10 and 11.

Making reference to the output $e_a$ produced by the MR elements $R_a$ and $R_a'$ forming a 3-terminal connection element in the circuit of FIG. 8, the output $e_b$ produced by the elements $R_b$ and $R_b'$ has a phase lag of $\pi/4$, and the outputs $e_c$, $e_d$ and $e_a'$ lag by $\pi/4$ from each preceding output. In the following description, the connection termed "3-terminal connection element" implies the arrangement as shown, for example, in FIG. 8 wherein both terminals of a serial connection of $R_a$ and $R_a'$ are connected across a voltage source V, and the node of the $R_a$ and $R_a'$ provides the output terminal. Adding the output $e_a$ to $e_b$ provides the output $e_a+e_b$ as shown in FIG. 12. By adding adjacent outputs sequentially, the 4-phase outputs of $e_a+e_b$, $e_b+e_c$, $e_c+e_d$, and $e_d+e_a'$ with a phase difference of $\pi/4$ from each other are obtained. Thereafter, two signals with the doubled frequency are extracted from signals $e_a+e_b$ and $e_c+e_d$ and signals $e_b+e_c$ and $e_d+e_a'$, each pair having a phase difference of $\pi/2$, through the process described later. The doubled number of pulses causes the phase relationship of the two signals with $\pi/2$, providing the 2-phase outputs representing the position of the moving member.

Figure 9:
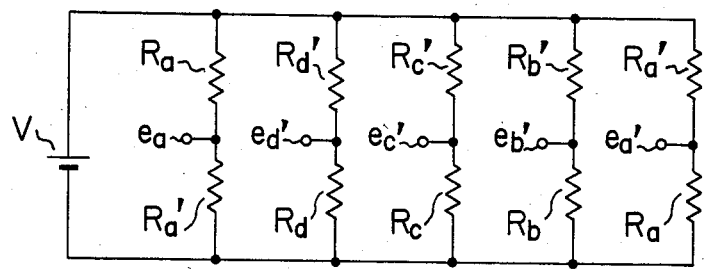

With respect to the output $e_a$ from the MR elements $R_a$ and $R_a'$ in the circuit of FIG. 9, the output $e_d'$ has a phase lead by $\pi/4$, and each of the output $e_c'$, $e_b'$ and $e_a'$ leads the successive output by $\pi/4$ in this order. Adding these outputs sequentially provides 4-phase outputs of $e_a+e_d'$, $e_d'+e_c'$, $e_c'+e_b'$ and $e_b'+e_d'$ with a phase difference of $\pi/4$ from each other as shown in FIG. 12. Pairs of signals $e_a+e_d'$ and $e_c'+e_b'$, and $e_d'+e_c'$ and $e_b'+e_a'$ are processed as will be described later, and 2-phase outputs with doubled number of pulses are obtained.

Figure 10:
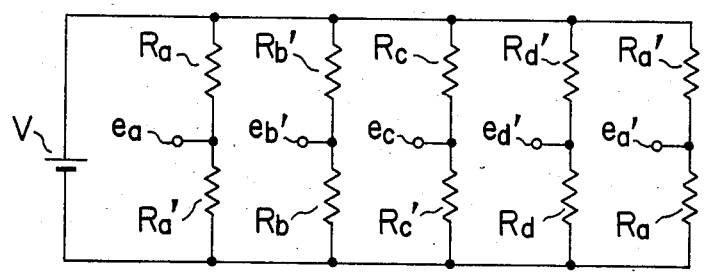

The circuit of FIG. 10 provides a phase difference of $(\pi+\pi/4)$ between the outputs, so that the signal $e_b'$ has a phase lag of $(\pi+\pi/4)$ with respect to the output $e_a$ and the signals $e_c$, $e_d'$ and $e_a'$ follow in this order with a phase lag of $(\pi+\pi/4)$ from the preceding one. Performing subtraction for output voltages, $e_a-e_b'$, $e_c-e_b'$, $e_c-e_d'$, and $e_a'-e_d'$ sequentially provides 4-phase outputs, which are equal to the signals obtained by the circuit shown in FIG. 8, with a phase difference of $\pi/4$ from each other as shown in FIG. 12.

Figure 11:
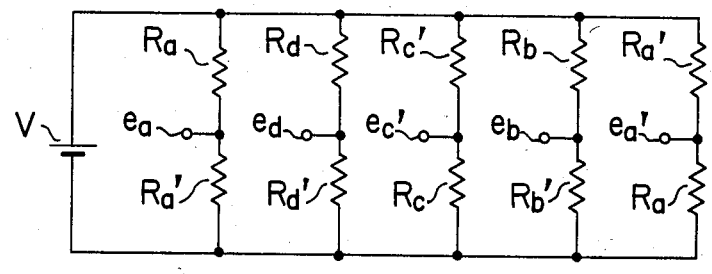

The connection of FIG. 11 provides a phase difference of $\pi-\pi/4$ between the outputs. The output $e_d$ follows the output $e_a$ with a phase lag of $\pi-\pi/4$, and then the outputs $e_c'$, $e_b$ and $e_a'$ follow in this order with a phase difference of $\pi-\pi/4$ from the preceding one. Subtraction is performed for these outputs sequentially and signals $e_a-e_d$, $e_c-e_d$, $e_c'-e_b$, and $e_a'-e_b$ are obtained. As shown in FIG. 12, these signals are equal to the signals $e_a+e_d'$, $e_d'+e_c'$, $e_c'+e_b$, and $e_b'+e_a'$ obtained by the circuit shown in FIG. 9, forming 4-phase outputs with a phase difference of $\pi/4$ from each other.

Thus, the fundamentals of the present invention are to combine five sets of signals among the outputs $e_a$ through $e_d'$ as described in connection with FIGS. 7 to 12 so as to obtain 4-phase (m-phase) signals with an amplitude approximately twice that of the signals $e_a$ through $e_d'$ and a phase difference of $\pi/4$ ($\pi/m$) from each other, and to obtain 2-phase output signals with doubled number of pulses by the successive processing.

The embodiments of the present invention will now be described with reference to FIGS. 13 through 40, where signals and components identical to those shown in FIGS. 7 through 11 are referred to by the common symbols.

Figure 13:
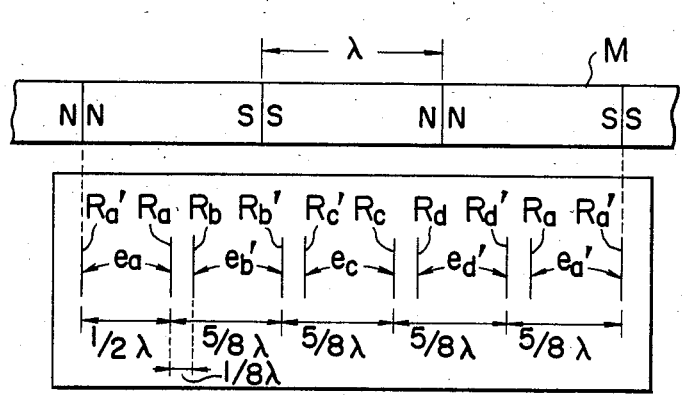
FIG. 13 is an illustration showing by expansion the positional relationship between the magnetoresistive elements and the wavelength λ of the magnetic recording signal on the moving member constituting the position detecting apparatus according to the first embodiment of the invention.

FIG. 13 shows the first embodiment of the invention, in which the number of phases m is selected to four. In the figure, five MR elements are disposed in a 4-phase magnetic sensor N in such a way that an element $R_b'$ is spaced by $\frac{5}{8}\lambda$ from $R_a$, an element $R_c$ is spaced by $\frac{5}{8}\lambda$ from the $R_b'$, and then $R_d'$ and $R_a'$ follow with the same phase difference from the preceding one. In addition, MR elements $R_a''$, $R_b$, $R_c'$, $R_d$, and $R_a$ are disposed correspondingly to the MR elements $R_a$, $R_b'$, $R_c$, $R_d'$, and $R_a'$ with a spacing of $\lambda/2$ ($\pi$) from each corresponding element located on the right-hand side in the figure so that the resistance variations of each pair have a phase difference of $\pi$. This arrangement provides 3-terminal connection for the MR elements $R_a$-$R_d$ and $R_a'$-$R_d'$.

Although the arrangement includes two sets of $R_a$ and $R_a'$, an arbitrary combination may be taken for these elements. Namely, for the number of phases m=4 with n=1, in order to obtain the phase difference of $\frac{5}{8}\lambda = \frac{5}{8} \times 2\pi = 5/4\pi = (n+1/m)\pi = (1+\frac{1}{4})\pi$, MR elements of m+1=4+1=5 sets are disposed to form a multiphase magnetic sensor N.

Figure 14:
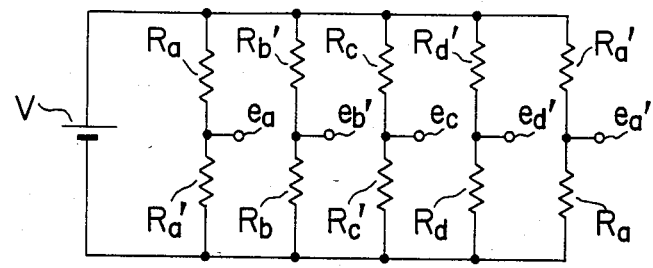
FIG. 14 is a schematic diagram showing the connection of the magnetoresistive elements shown in FIG. 13.

The following describes the multi-phase to 2-phase conversion of this embodiment. The MR elements are connected to respective three terminals as shown in FIG. 14 and a voltage V is applied to the ends of the 3-terminal connections so that voltage outputs $e_a$, $e_b'$, $e_c$, $e_d'$, and $e_a'$ are obtained at respective output terminals in response to the movement of a magnetic moving member M.

Figure 16:
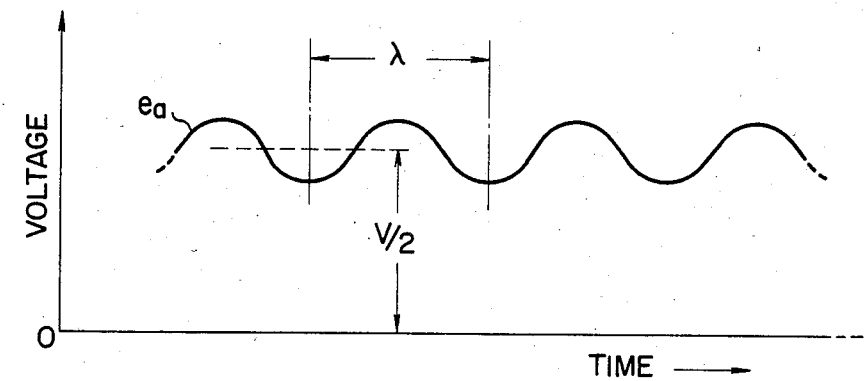
FIG. 16 is a diagram explaining the output voltage shown in FIG. 15.
Figure 15:
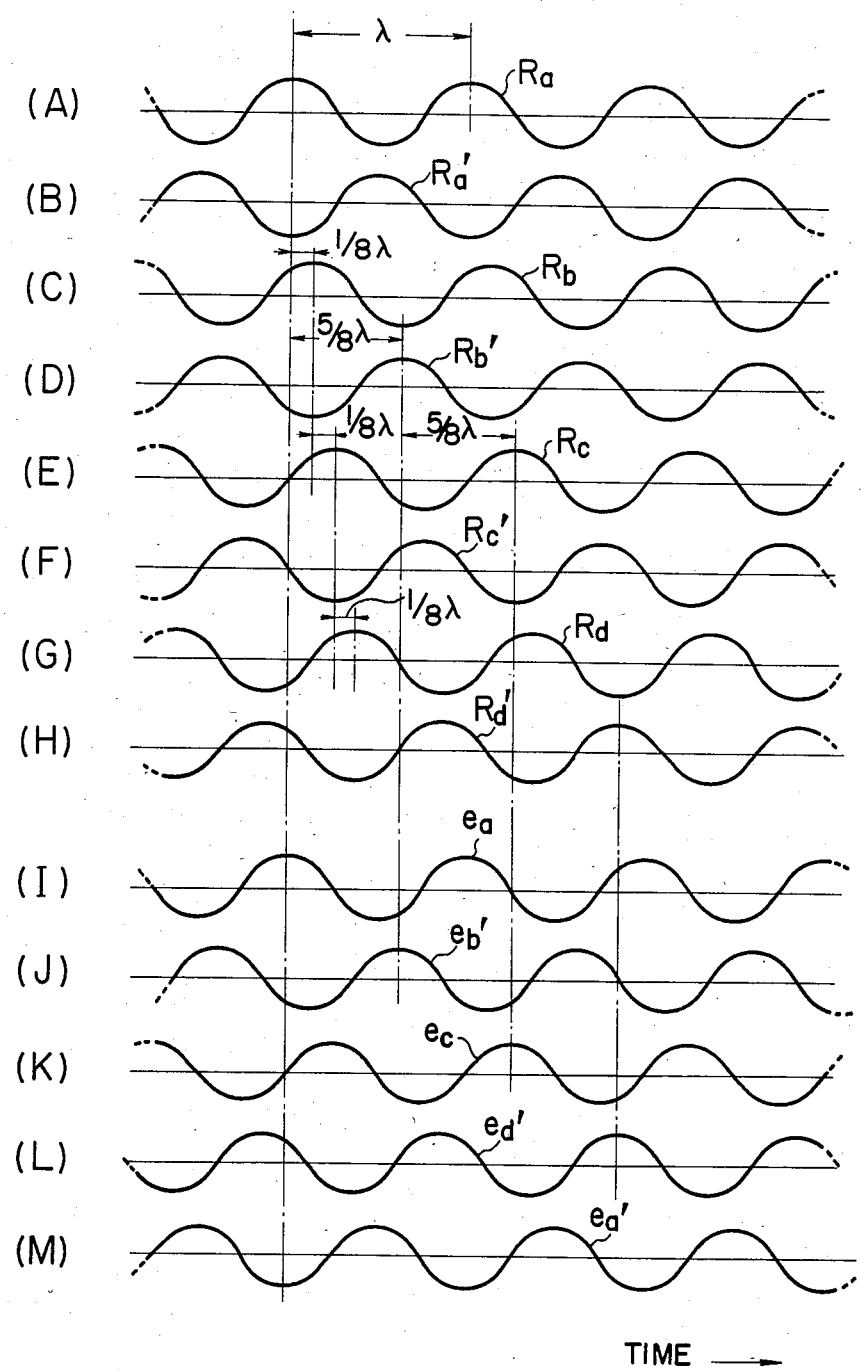
FIG. 15 is a set of waveform diagrams showing the resistance variations of the magnetoresistive elements shown in FIG. 13 and the waveforms of output voltages produced by the circuit of FIG. 14.

As mentioned previously, the MR element has a variable resistance responsive to the magnetic field, and when the moving member M shown in FIG. 13 travels to the right the MR elements provide varying resistances as shown by (A) through (H) in FIG. 15. In FIG. 15, one set of MR elements $R_a$ and $R_a'$ has the same resistance variation as that of another set, and the waveform of the former is omitted. In response to the resistance variations, the voltage outputs vary as shown by (I) through (M) in FIG. 15. FIG. 16 shows the mean voltage level (V/2) of the output voltage $e_a$.

As stated previously, the outputs of the MR elements have a phase difference of $\frac{5}{8}\lambda$, i.e., $5/4\pi$ which is larger than $\pi/2$ and the outputs are combined as follows to obtain m-phase, i.e., 4-phase, outputs as shown by (A)-(D) in FIG. 18. Namely, differential voltages between outputs $e_a$ and $e_b'$, outputs $e_c$ and $e_b'$, outputs $e_c$ and $e_d'$, and outputs $e_a'$ and $e_d'$ are evaluated sequentially.

Figure 17:
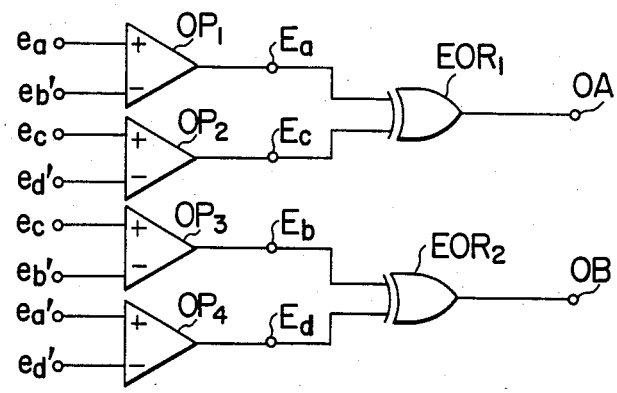
FIG. 17 is a schematic diagram of the waveform shaping circuit for shaping the output voltages produced by the circuit of FIG. 14.

The signals $e_a$, $e_b'$, and so on are conducted to the inputs of the amplifiers $OP_1$ through $OP_4$, which may be voltage comparators or differential amplifiers, so that signals Ea through Ed are obtained at their outputs, as shown in FIG. 17. The amplifiers are designed to have a sufficiently high gain, so that they provide m-phase, i.e., 4-phase rectangular output signals Ea through Ed as shown by (E)-(H) in FIG. 18.

Thereafter, the first output signal Ea and the third output signal Ec, and the second output signal Eb and the fourth output signal Ed are combined respectively, i.e., odd numbered phase outputs and even numbered phase outputs are paired on exclusive OR gates $EOR_1$ and $EOR_2$ or other waveform combine circuits, respectively, as shown in FIG. 17, so that the 2-phase outputs OA and OB carrying positional information of the moving member are obtained as shown by (I) and (J) in FIG. 18.

The 2-phase outputs OA and OB have a frequency (output pulses) twice that of the intermediate signals Ea through Ed, with a phase difference of $\pi/2$ in an electrical angle between the two outputs.

Figure 19:
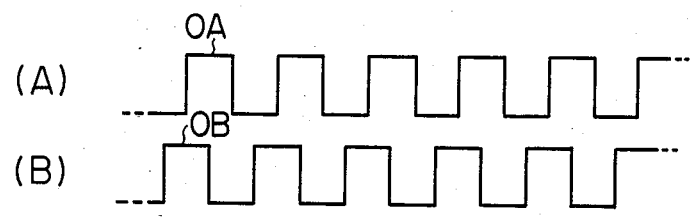
FIG. 19 is a waveform diagram for the supplemental explanation on the positional relationship between the output signals OA and OB.

When the moving member M moves reversely, i.e., from right to left, the phase relationship of the waveforms shown in FIG. 15 reverses, causing the 2-phase outputs OA and OB shown by (I) and (J) in FIG. 18 to have the opposite phase relationship, and the output OB leads the output OA by $\pi/2$ as shown in FIG. 19.

Figure 1:
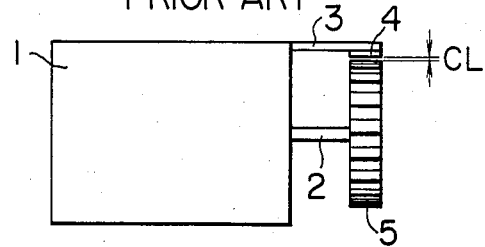
FIG. 1 is an illustration showing the prior art system including a magnetic rotation sensor and a rotating member.
Figure 2:
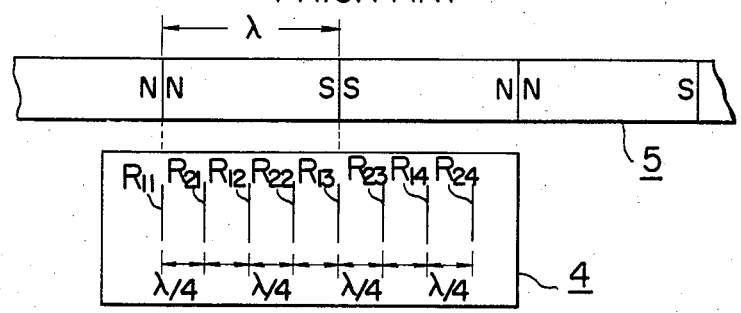
FIG. 2 is an illustration showing by expansion the positional relationship between the magnetic rotation sensor and the rotating member shown in FIG. 1.
Figure 3:
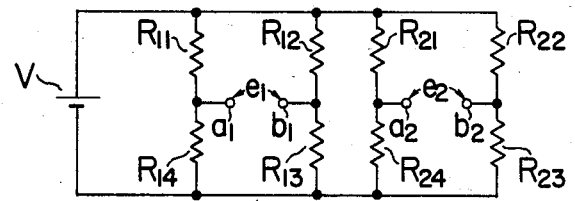
FIG. 3 is a schematic diagram showing the connection of the magnetoresistive elements in the rotation sensor shown in FIG. 1.
Figure 4:
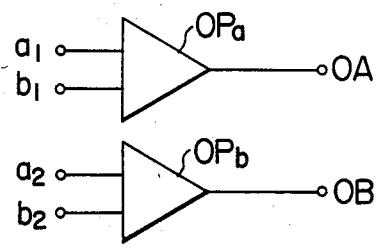
FIG. 4 is a schematic diagram of the waveform shaping circuit which performs waveform shaping for the signals produced by the circuit shown in FIG. 3.
Figure 5:
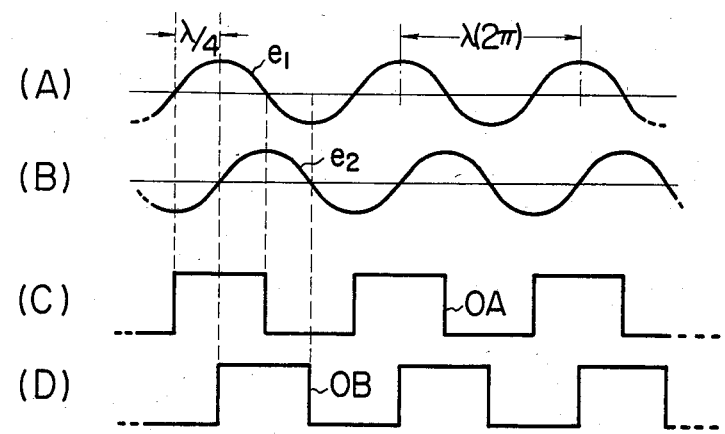
FIG. 5 is a set of waveform diagrams showing the timing relationship between the output waveforms provided by the circuit of FIG. 3 and the waveforms shaped by the circuit of FIG. 4.
Figure 6:
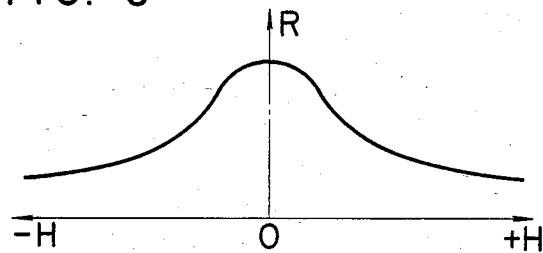
FIG. 6 is a graph explaining the relation between the magnetic field strength and the resistance of a magnetoresistance element.

According to this embodiment, as described above, the number of output pulses is doubled without changing the wavelength $\lambda$ of the signal recorded on the magnetic moving member M. The number of MR elements is ten as shown in FIG. 13, the only increase of two from the conventional arrangement with eight elements shown in FIG. 2. The 2-phase outputs have a phase difference of $\pi/2$, with its polarity depending on the moving direction, allowing discrimination of moving direction in the same way as the conventional system.

In the foregoing embodiment, it should be noted that the MR elements in 3-terminal connections as described with FIG. 13 may be simple resistors, and also the MR elements wired may separately be mounted on another member instead of being disposed within the sensor. Output conversion takes place automatically due to the connection of each section in response to the movement of the moving member, and this is common to all embodiments of the invention.

Figure 20:
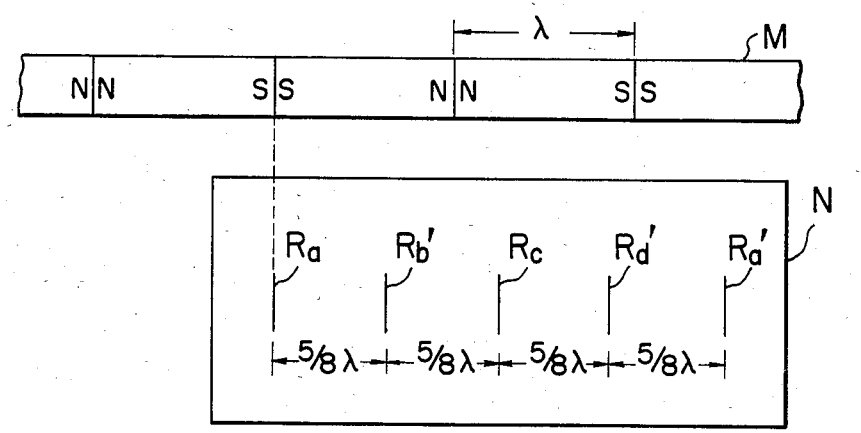
FIG. 20 is an illustration showing by expansion the positional relationship between the magnetoresistive elements and the wavelength λ of the magnetic recording signal on the moving member constituting the position detecting apparatus according to the second embodiment of the invention.
Figure 21:
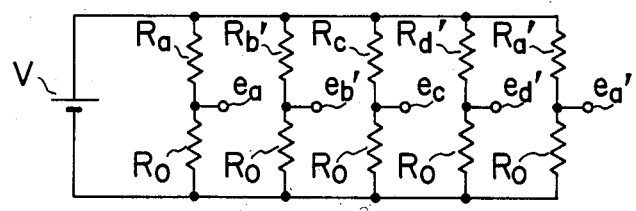
FIG. 21 is a schematic diagram showing the connection of the magnetoresistive elements shown in FIG. 20.

The second embodiment of the present invention will be described with reference to FIGS. 20 and 21. Five MR elements $R_a$, $R_b'$, $R_c$, $R_d'$, and $R_a'$ are disposed with a spacing of $\frac{5}{8}\lambda$ from each other within a magnetic sensor N, as in the case of the first embodiment. Resistors $R_o$ in 3-terminal connections are disposed in the magnetic sensor N to form a multi-phase magnetic sensor. The MR elements and resistors $R_o$ are connected in 3-terminal connections as shown in FIG. 21, with a voltage V applied to the ends of each connection, so that voltage outputs $e_a$, $e_b'$, $e_c$, $e_d'$, and $e_a'$ are obtained at the output terminals of the connections. These outputs have the same waveform as that shown previously in FIG. 15, and processing of the output signals by the circuit shown in FIG. 17 provides the 2-phase outputs OA and OB with doubled number of pulses as shown in FIG. 18, whereby the same effect as of the first embodiment is achieved. The resistors in 3-terminal connections in this embodiment may be of simple resistors or MR elements insusceptible to the magnetic field of the magnetic moving member and also they may separately be mounted on another member, as in the case of the first embodiment.

Figure 22:
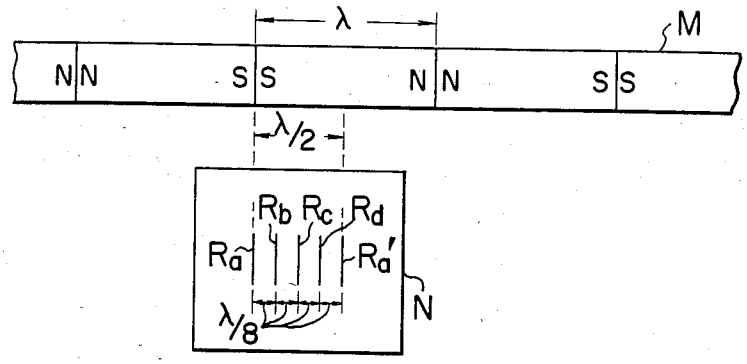
FIG. 22 is an illustration showing by expansion the positional relationship between the magnetoresistive elements and the wavelength λ of the magnetic recording signal on the moving member constituting the position detecting apparatus according to the third embodiment of the invention.
Figure 23:
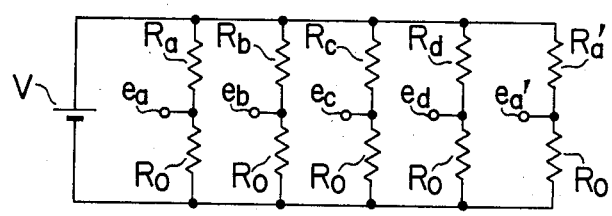
FIG. 23 is a schematic diagram showing the connection of the magnetoresistive elements shown in FIG. 22.
Figure 24:
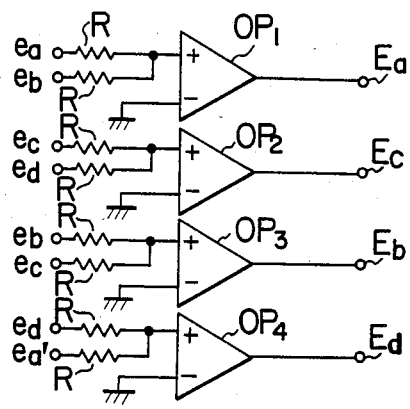
FIG. 24 is a schematic diagram of the waveform shaping circuit for shaping the output voltages produced by the circuit of FIG. 23.

The third embodiment will be described with reference to FIGS. 22 through 24. In FIG. 22, five MR elements $R_a$, $R_b$, $R_c$, $R_d$, and $R_a'$ are disposed with a spacing of $\lambda/8$, where $\lambda$ is the wavelength of the recording signal, within a magnetic sensor N. Namely, for the number of phases m=4 with n=0, MR elements of m+1=4+1=5 in number ($R_a$, $R_b$, $R_c$, $R_d$, and $R_a'$) are disposed such that the phase difference of $\lambda/8 = \frac{1}{8} \times 2\pi = \pi/4 = (n+1/m)\pi = (0+\frac{1}{4})\pi$ is obtained. In addition, resistors $R_o$ (not shown) are disposed in the magnetic sensor N to form a multi-phase magnetic sensor. The MR elements and resistors are connected in 3-terminal connections as shown in FIG. 23, with a voltage V applied to the ends of each connection, so that the voltage outputs $e_a$, $e_b$, $e_c$, $e_d$, and $e_a'$ are obtained at the output terminals of the connections. The outputs $e_a$, $e_c$ and $e_a'$ have waveforms identical to those shown by (I), (K) and (M) in FIG. 15, and the outputs $e_b$ and $e_d$ have waveforms with a phase difference of $\pi$ from the previous outputs $e_b'$ and $e_d'$ shown by (J) and (L), respectively, in FIG. 15. Accordingly, each pair of the outputs $e_a$ and $e_b$, outputs $e_b$ and $e_c$, outputs $e_c$ and $e_d$, and outputs $e_d$ and $e_a'$ has a phase difference of $\lambda/8$. These MR elements provide the outputs with a phase difference of $\lambda/8$, i.e., $\pi/4$ and it does not exceed $\pi/2$, and these outputs are combined as follows to obtain m-phase, i.e., 4-phase, outputs. The outputs $e_a$, $e_b$, $e_c$, $e_d$, and $e_a'$ are connected as shown in FIG. 24 and the output signals Ea through Ed are obtained at the outputs of amplifiers $OP_1$ through $OP_4$ which perform amplification and wave shaping. The amplifier outputs have a phase relationship as shown previously in FIG. 18, and the same 2-phase outputs OA and OB carrying positional information as those of the first embodiment are obtained. The resistors in 3-terminal connections may be dealt with identically to the case of the second embodiment.

Figure 25:
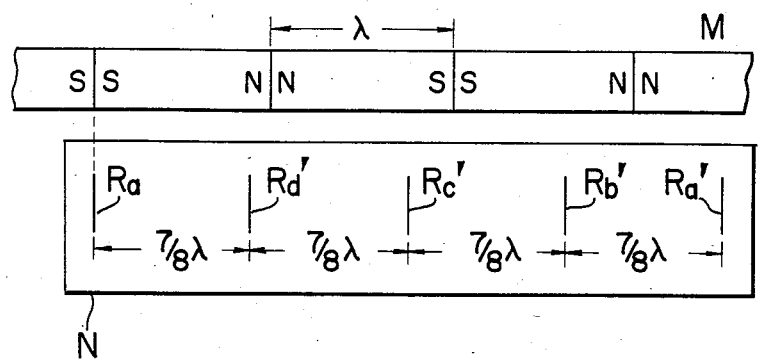
FIG. 25 is an illustration showing by expansion the positional relationship between the magnetoresistive elements and the wavelength λ of the magnetic recording signal on the moving member constituting the position detecting apparatus according to the fourth embodiment of the invention.
Figure 26:
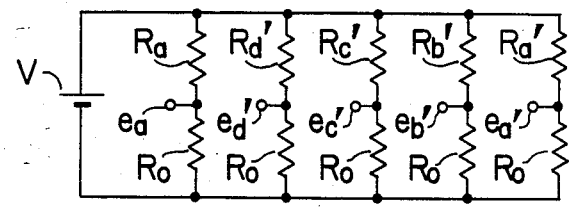
FIG. 26 is a schematic diagram showing the connection of the magnetoresistive elements shown in FIG. 25.
Figure 27:
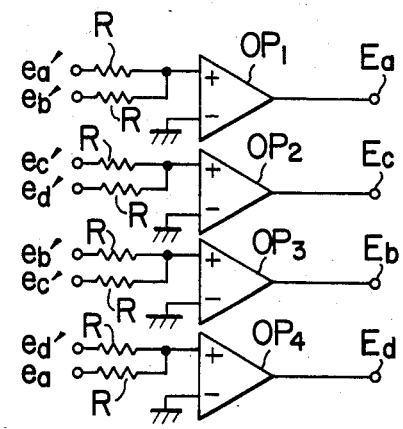
FIG. 27 is a schematic diagram of the waveform shaping circuit for shaping the output voltages produced by the circuit of FIG. 26.

The fourth embodiment will be described with reference to FIGS. 25 through 27. In FIG. 25, MR elements of m+1=5 in number are disposed with a spacing of $\frac{7}{8}\lambda$, i.e., for n=2 and m=4, $(n-1/m)\pi = 7/4\pi$, where $\lambda$ is the wavelength of the recording signal, within a magnetic sensor N. In addition, resistors $R_o$ (not shown) in 3-terminal connections are disposed in the magnetic sensor N so that they are insusceptible to the magnetic field of the magnetic moving member M, and a multi-phase magnetic sensor is completed. The MR elements and resistors are connected in 3-terminal connections as shown in FIG. 26, with a voltage V applied to the ends of each connection, so that voltage signals $e_a$, $e_d'$, $e_c'$, $e_b'$, and $e_a'$ are obtained at the output terminals of the connections. The outputs $e_a$, $e_d'$, $e_b'$, and $e_a'$ have the same waveforms as those shown in FIG. 15 and the output $e_c'$ is out of phase with $e_c$ shown by (K) in FIG. 15 by the amount of $\pi$. The outputs are amplified and shaped by the circuit shown in FIG. 27, and signals Ea, Eb, Ec and Ed are obtained. These signals Ea, Eb, Ec, and Ed are processed to obtain 2-phase outputs OA and OB as in the case of the previous embodiments.

Also in this embodiment, the resistors $R_o$ may be dealt with identically to the case of the second embodiment.

Figure 28:
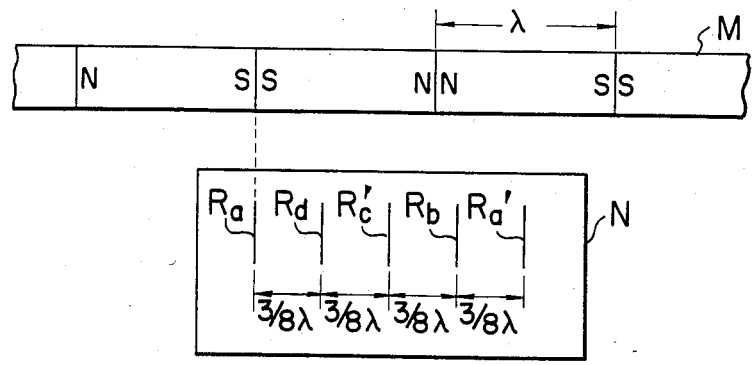
FIG. 28 is an illustration showing by expansion the positional relationship between the magnetoresistive elements and the wavelength λ of the magnetic recording signal on the moving member constituting the position detecting apparatus according to the fifth embodiment of the invention.
Figure 29:
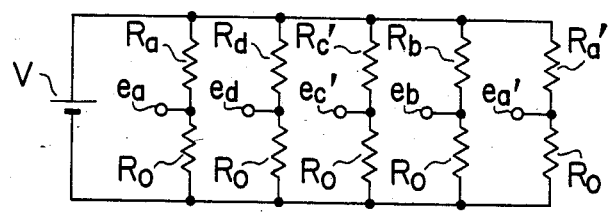
FIG. 29 is a schematic diagram showing the connection of the magnetoresistive elements shown in FIG. 28.
Figure 30:
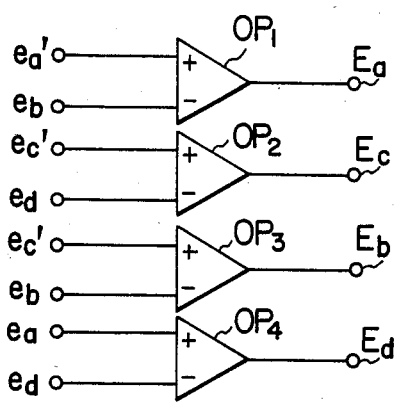
FIG. 30 is a schematic diagram of the waveform shaping circuit for shaping the output voltages produced by the circuit of FIG. 29.

The fifth embodiment will be described with reference to FIGS. 28 through 30. In FIG. 28, MR elements $R_a$, $R_d$, $R_c'$, $R_b$, and $R_a'$ of m+1=5 in number are disposed with a spacing of $\frac{3}{8}\lambda$, i.e., $(n-1/m)\pi = \frac{3}{4}\pi$ for n=1 and m=4 within a magnetic sensor N. Resistors $R_o$ are disposed so that they are insusceptible to the magnetic field of the magnetic moving member M, and a multiphase magnetic sensor is formed. The MR elements and resistors are connected as shown in FIG. 29, and outputs $e_a$, $e_d$, $e_c'$, $e_b$, and $e_a'$ are obtained. The outputs are processed by the circuit shown in FIG. 30, and signals Ea, Eb, Ec, and Ed are obtained.

Also in this embodiment, the resistors $R_o$ may be dealt with identically to the case of the second embodiment.

Figure 31:
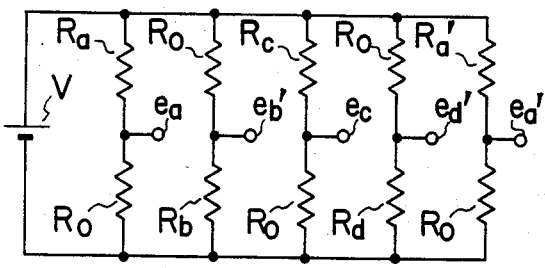
FIG. 31 is a schematic diagram showing the connection of the magnetoresistive elements according to the sixth embodiment of the invention.

FIG. 31 shows the connection of MR elements and resistors in the multi-phase magnetic sensor according to the sixth embodiment of the invention. The arrangement employs the disposition of MR elements of the third embodiment shown in FIG. 22, but with different connections for the resistors $R_o$ in 3-terminal connections to the power source as shown in FIG. 31, and outputs $e_a$, $e_b'$, $e_c$, $e_d'$ are obtained. These outputs are the same shown in FIG. 14, and the 2-phase outputs OA and OB are obtained as has been described in connection with FIGS. 15 through 19.

Although various combinations of disposition for MR elements are possible in the foregoing embodiments for 4-phase sensors (m=4), the basic arrangement is the provision of a phase difference of $\lambda/2m$, i.e., $\pi/m$, for the number of phases of m, and this value is added by $\pi$ or the value of $\pi$ is subtracted by $\pi/m$ to form individual dispositions.

In the connection diagrams referred to in the foregoing embodiments, the output terminals for output $e_a$, $e_b$, and so on are led out to the right or left, but both are functionally identical.

Figure 32:
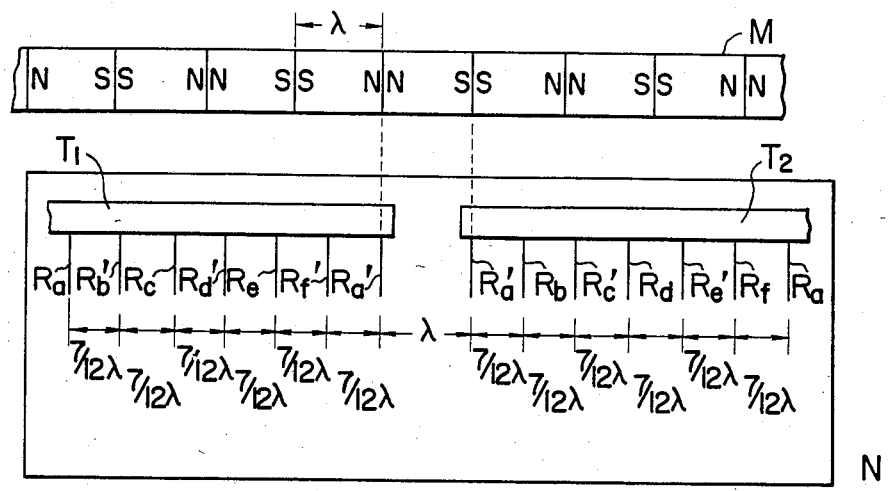
FIG. 32 is an illustration showing by expansion the positional relationship between the magnetoresistive elements and the wavelength λ of the magnetic recording signal on the moving member constituting the position detecting apparatus according to the seventh embodiment of the invention.
Figure 33:
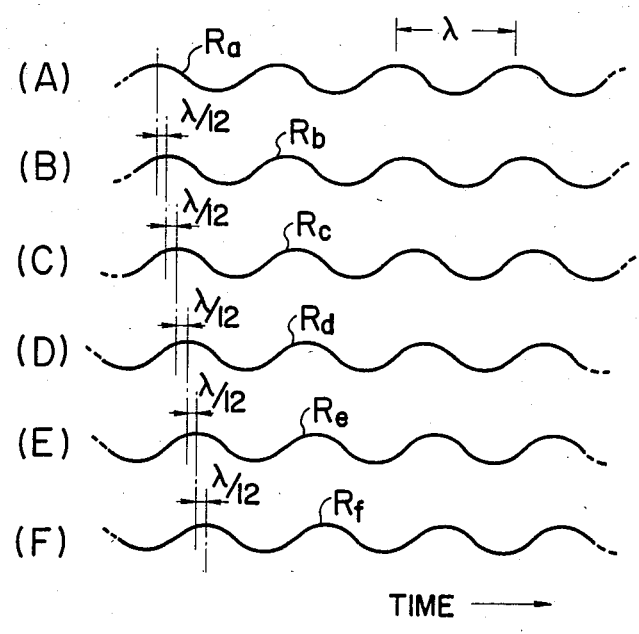
FIG. 33 is a set of waveform diagrams showing the resistance variations of the magnetoresistive elements shown in FIG. 32.
Figure 34:
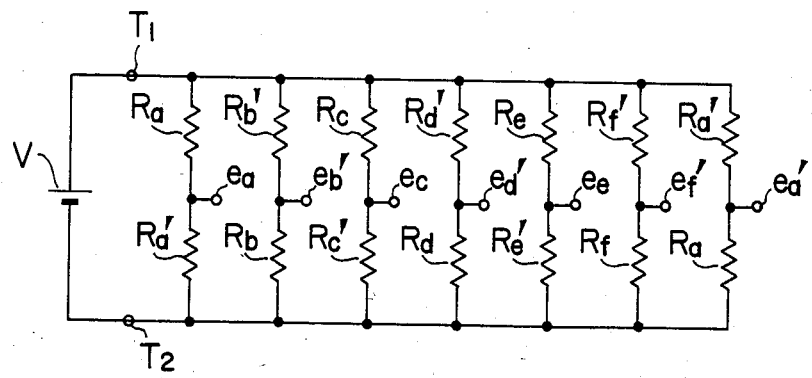
FIG. 34 is a schematic diagram showing the connection of the magnetoresistive elements shown in FIG. 32.

Next, the 6-phase magnetic sensor (m=6) according to the present invention will be described with reference to FIGS. 32 through 36. In FIG. 32, seven MR elements $R_a$, $R_b'$, $R_c$, $R_d'$, $R_e$, $R_f'$, and $R_a'$ are disposed with a spacing of $7/12\lambda$, i.e., $(n+1/m)\pi = 7/6\pi$ for $n=1$ and $m=6$, and connected to a terminal section $T_1$. Also disposed with a phase difference of $\pi$ (opposite a phase) from the former element group are MR elements $R_a'$, $R_b$, $R_c'$, $R_d$, $R_e'$, $R_f$, and $R_a$, which are connected to a terminal section $T_2$ to complete a multi-phase magnetic sensor N. The MR element $R_a$ on the terminal section $T_1$ is out of phase with the MR element $R_a'$ on the terminal section $T_2$ by $(7/12)\lambda \times 6 + \lambda = /(54/12)\lambda = (9/2)\lambda = 9\pi$, i.e., a phase difference of $\pi$ in electrical angle. In FIG. 34, serial connections are made for pairs of MR elements $R_a$ and $R_a'$, $R_b'$ and $R_b$, $R_c$ and $R_c'$, $R_d'$ and $R_d$, $R_e$ and $R_e'$, $R_f'$ and $R_f$, and $R_a'$ and $R_a$, with the terminal section $T_1$ connected to the positive side of the power source V and the terminal section $T_2$ to the negative side. When the magnetic moving member M is moved to the right, the resistance of the MR elements $R_a$ through $R_f'$ will vary as shown in FIG. 33. On the other hand, the MR elements $R_a'$ through $R_f$ provide the waveforms which are out of phase by $\pi$, i.e., opposite phase, with the waveforms shown in FIG. 33.

Figure 35:
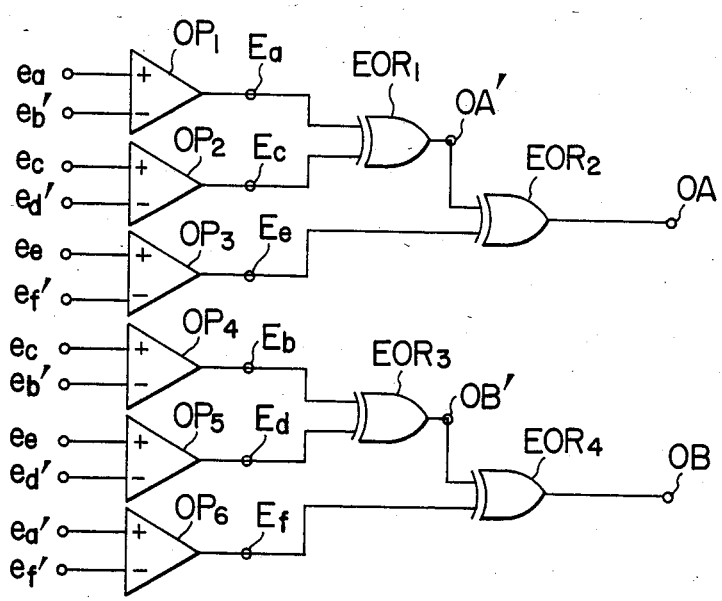
FIG. 35, is a schematic diagram of the waveform shaping circuit for shaping the output voltages produced by the circuit shown in FIG. 35.
Figure 36:
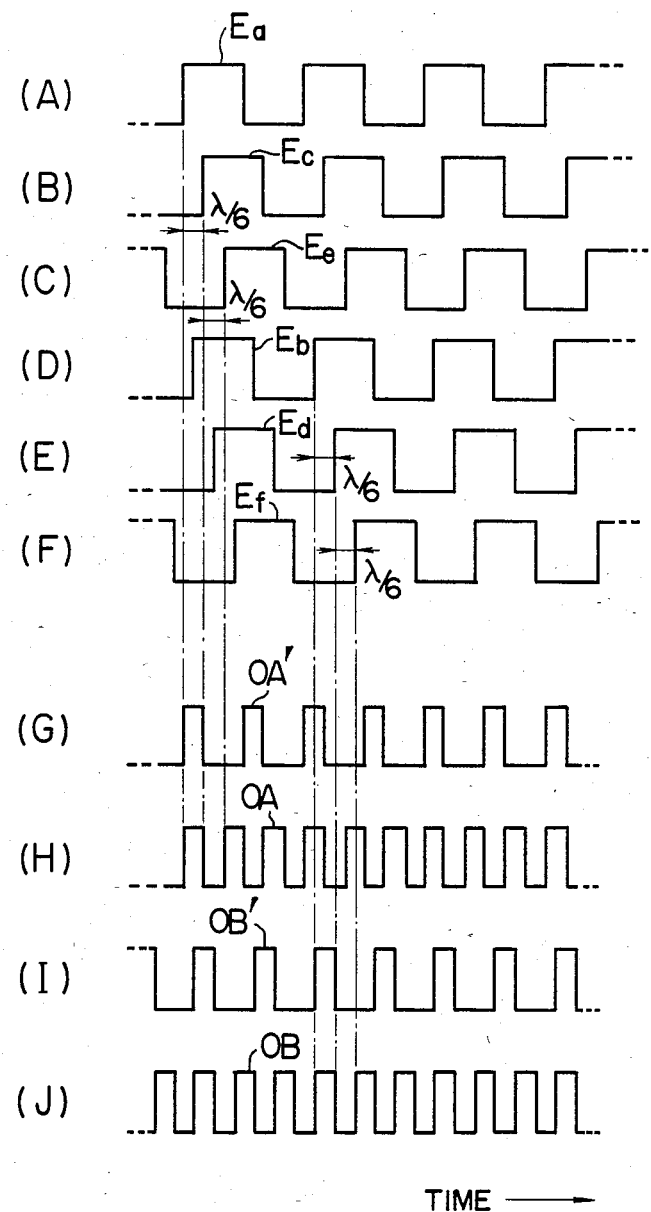
FIG. 36 is a set of waveform diagrams showing the phase relationship between the voltage signals at various portions of the circuit of FIG. 35.

Accordingly, the outputs $e_a$, $e_b'$, $e_c$, $e_d'$, $e_e$, $e_f'$, and $e_a'$ shown in FIG. 34 provide voltage waveforms corresponding to the MR elements $R_a$, $R_b'$, $R_c$, $R_d'$, $R_e$, $R_f'$, and $R_a'$. These outputs are combined on amplifiers $OP_1$ through $OP_6$ as shown in FIG. 35 to take the difference of each pair, and the amplifiers provide the rectangular outputs Ea through Ef as shown in FIG. 36. These signals are grouped into one block including Ea, Ec and Ee and another block including Eb, Ed and Ef, so that both groups are processed through exclusive-OR gates $EOR_1$ and $EOR_3$ shown in FIG. 35 or other waveform combine circuits to obtain intermediate outputs OA' and OB' as shown by (G) and (I) of FIG. 36, respectively, and further processed by exclusive-OR gates $EOR_2$ and $EOR_4$ shown in FIG. 35 or other waveform combine circuits to obtain 2-phase outputs OA and OB. The 2-phase output signals OA and OB have a phase difference of $\pi/2$ and a period $\frac{1}{3}$ that of the wavelength $\lambda$ of the recording signal, thus increasing the number of pulses by three times. When the magnetic moving member M shown in FIG. 32 is moved to the left, the waveforms of FIGS. 33 and 36 will have the opposite phase relationship, i.e., output OA lags behind output OB by $\pi/2$, allowing the discrimination of rotational direction as in the conventional 2-phase rotation sensor.

Figure 37:
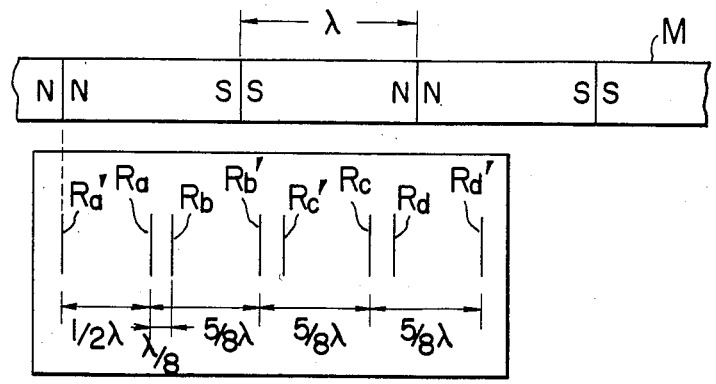
FIG. 37 is an illustration showing the positional relationship between the magnetoresistive elements and the wavelength λ of the magnetic recording signal on the moving member constituting the eighth embodiment of the invention.
Figure 38:
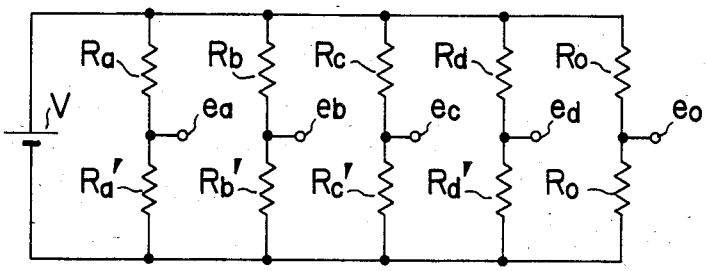
FIG. 38 is a schematic diagram showing the connection of the magnetoresistive elements shown in FIG. 37.
Figure 39:
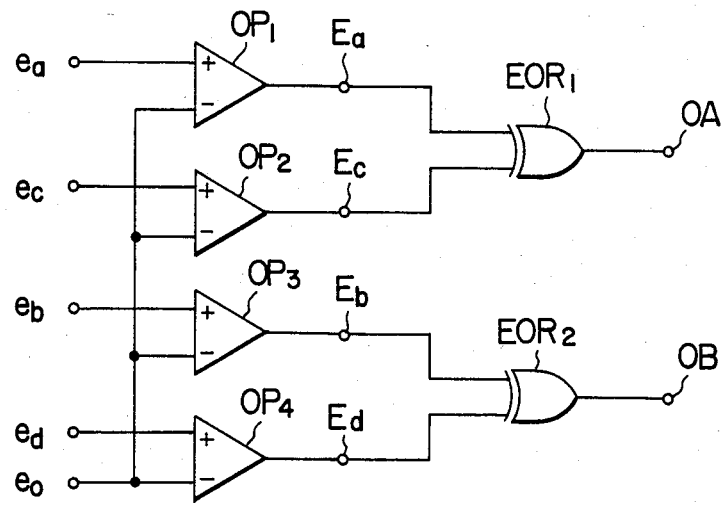
FIG. 39 is a schematic diagram of the waveform shaping circuit for shaping the output voltages produced by the circuit of FIG. 38.
Figure 40:
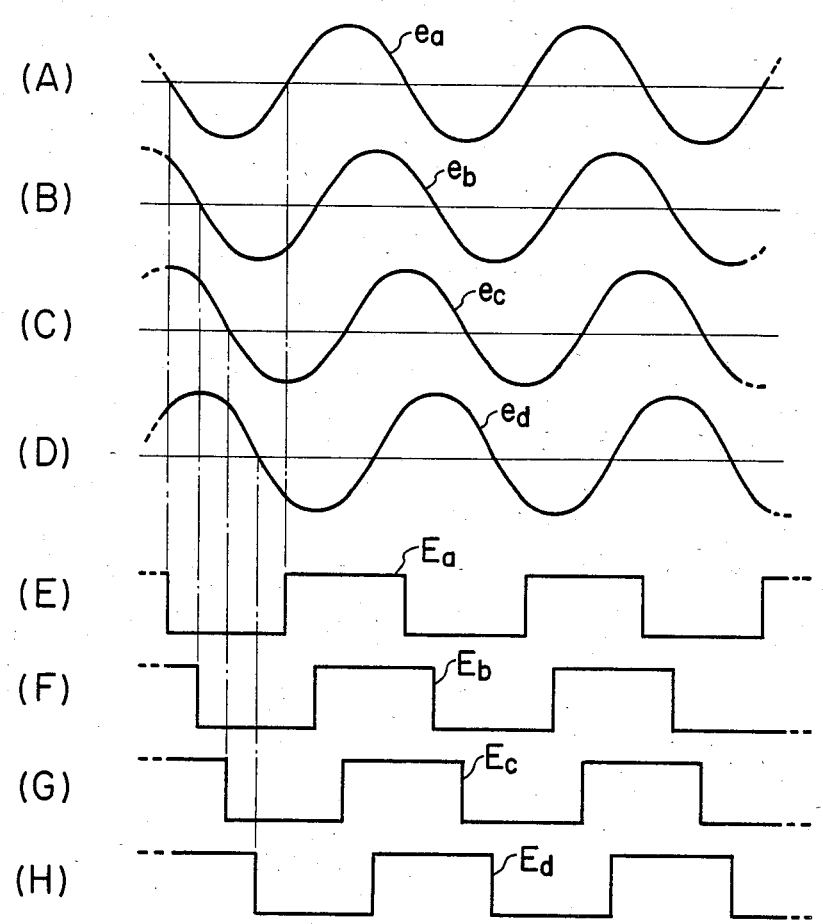
FIG. 40 is a set of waveform diagrams showing the phase relationship between the voltage signals at various portions of the circuit shown in FIG. 39.

These are the arrangements using $m+1$ sets of magnetoresistive elements. The following describes an example using m sets of magnetoresistive elements with reference to FIGS. 37 through 40. With the disposition of MR elements as shown in FIG. 37, the movement of the magnetic moving member M causes the resistance of the MR elements $R_a$ through $R_d$, and $R_a'$ through $R_d'$ to vary in the same waveforms as those shown in FIG. 15. The MR elements are connected as shown in FIG. 38, and the outputs $e_a$ through $e_d$ of the 3-terminal connections are as shown in FIG. 40. These outputs are processed by the waveform shaping/output converting circuit shown in FIG. 39. Waveform shaping amplifiers $OP_1$ through $OP_4$ receives at their one inputs the respective signals $e_a$ through $e_d$, with their remaining inputs receiving commonly a voltage $e_o$ produced by dividing the voltage V of the power source by a fixed resistor $R_o$. In this arrangement, the amplifiers, $OP_1$ through $OP_4$ provide the outputs Ea through Ed as shown in FIG. 40. These waveforms are the same shown by (E), (F), (G) and (H) in FIG. 18, and output OA is produced from Ea and Ec and output OB is produced from Eb and Ed as described previously. Thus, this is a rotation sensor with 2-phase outputs, which needs only m sets of MR elements, less than the arrangement of FIG. 13 by one element.

Although the foregoing embodiments are of 4-phase or 6-phase, the present invention is applicable to realize multi-phase magnetic sensors of even number of phases, such as 8-phase, 10-phase, 12-phase, etc., by using MR elements larger in number by one set than the number of phases m, or MR elements equal in number to m.

The advantages of the present invention are summarized in the following.

(1) The number of output pulses of an m-phase magnetic sensor can be increased by m/2 times by using $m+1$ or m MR elements, but without decreasing the wavelength $\lambda$ of the signal recorded on the magnetic moving member.

(2) Use of $m+1$ sets of MR elements for a m-phase magnetic sensor provides output pulses m/2 times in number, allowing reduction in the number of MR elements.

(3) Owing to the above properties (1) and (2), a compact, light weight, and precise multi-phase magnetic sensor can be designed without increasing the outer diameter of the rotational magnetic member.

(4) The number of output pulses can be increased without decreasing the wavelength $\lambda$ of the signal recorded on the magnetic moving member, allowing a larger gap between the magnetic moving member and the magnetic sensor, whereby multi-phase magnetic sensors suited to mass production can be designed.

(5) The inventive m-phase magnetic sensor provides 2-phase outputs OA and OB with a frequency (output pulses) m/2 times as much as the 1-phase output, e.g., two times for a 4-phase arrangement, or three times for a 6-phase arrangement, with a phase difference of $\pi/2$ in electrical angle between the outputs OA and OB.

(6) The output phase difference of $\pi/2$ in electrical angle, with its polarity depending on the moving direction of the magnetic moving member, allows discrimination of the moving direction in the same way as of the conventional sensor.

We claim:

1. A muti-phase magnetic sensor apparatus for detecting the position of a moving member comprising: a moving member having a magnetic substance with magnetical signals recorded thereon; a stationary magnetic sensor confronting said moving member and having a plurality of magnetoresistive elements disposed in said magnetic sensor, said magnetoresistive elements having a phase difference of $\pi/m$ in output electrical angle, where m is an even number larger than or equal to four; first combining means for combining electrical outputs of said magnetoresistive elements, the electrical angles of said electrical outputs differing from each other by a phase difference of $\pi/m$, and for outputting the combined electrical outputs; and second combining means for combining said combined electrical outputs from said first combining means, electrical angles of said combined electrical outputs sequentially differing from each other by a phase difference of $2\pi/m$, so that two positional signals of said moving member are obtained, the positional signals differing from each other by a phase difference of $\pi/2$.

2. A position detecting apparatus according to claim 1, wherein said magnetoresistive elements are m+1 in number.

3. A position detecting apparatus according to claim 1, wherein said magnetoresistive elements are m in number.

4. A position detecting apparatus according to claim 1, further comprising a plurality of other magneto-resistive elements, each of said other magneto-resistive elements being connected in series to each of said magneto-resistive elements in order to form a 3-terminal connection element which has an output terminal and two input terminals connected to a DC voltage source.

5. A position detecting apparatus according to claim 1, further comprising a plurality of resistors, each of said resistors being connected in series to each of said magnetoresistive elements in order to form a 3-terminal connection element which has an output terminal and two input terminals connected to a DC voltage source.

6. A multi-phase magnetic sensor apparatus for detecting the position of a moving member comprising a moving member having a magnetic substance with magnetical signals recorded thereon, and a stationary magnetic sensor confronting said moving member and having a plurality of magnetoresistive elements disposed in said magnetic sensor, said magnetoresistive elements having a phase difference of $\pi/m$ in output electrical angle, where m is an even number larger than or equal to four, for obtaining the positional signal of said moving member, a plurality of other magnetoresistive elements, each of said other magnetoresistive elements being connected in series to each of said magneto-resistive elements in order to form a 3-terminal connection element which has an output terminal and two input terminals connected to a DC voltage source, first means which combines, in pair, voltage outputs at the output terminals of said 3-terminal connection elements, each pair of outputs having a phase difference of $\pi/m$ in electrical angle, and provides one positional signal and another positional signal through waveform combine circuits such as exclusive-OR gate circuits.

7. A multi-phase magnetic sensor apparatus for detecting the position of a moving member comprising a moving member having a magnetic substance with magnetical signals recorded thereon, and a stationary magnetic sensor confronting said moving member and having a plurality of magnetoresistive elements disposed in said magnetic sensor, said magneto-resistive elements having a phase difference of $\pi/m$ in output electrical angle, where m is an even number larger than or equal to four, for obtaining the positional signal of said moving member, a plurality of resistors, each of said resistors being connected in series to each of said magnetoresistive elements in order to form a 3-terminal connection element which has an output terminal and two input terminals connected to a DC voltage source, first means which combines, in pair, voltage outputs at the output terminals of said 3-terminal connection elements, each pair of outputs having a phase difference of $\pi/m$ in electrical angle, and provides rectangular waves, and second means which combines, in pair, said rectangular waves, each pair of waves having a phase difference of $2\pi/m$ in electrical angle, and provides one positional signal and another positional signal through waveform combine circuits such as exclusive-OR gate circuits.

* * * * *